United States Patent
Kirat et al.

(10) Patent No.: US 11,032,251 B2
(45) Date of Patent: Jun. 8, 2021

(54) AI-POWERED CYBER DATA CONCEALMENT AND TARGETED MISSION EXECUTION

(71) Applicant: International Business Machines Corporation, Armonk, NY (US)

(72) Inventors: Dhilung Hang Kirat, White Plains, NY (US); Jiyong Jang, Ossining, NY (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 16/023,756

(22) Filed: Jun. 29, 2018

(65) Prior Publication Data
US 2020/0007512 A1   Jan. 2, 2020

(51) Int. Cl.
*H04L 29/06* (2006.01)
*G06F 21/60* (2013.01)
(Continued)

(52) U.S. Cl.
CPC ........ *H04L 63/0428* (2013.01); *G06F 21/602* (2013.01); *G06F 21/606* (2013.01);
(Continued)

(58) Field of Classification Search
None
See application file for complete search history.

(56) References Cited

U.S. PATENT DOCUMENTS

| 8,316,237 | B1 * | 11/2012 | Felsher | H04L 9/0825 |
| | | | | 713/171 |
| 8,370,644 | B2 * | 2/2013 | Handschuh | G06F 21/554 |
| | | | | 713/193 |

(Continued)

FOREIGN PATENT DOCUMENTS

| CN | 105868678 A | 1/2015 |
| WO | 2009149926 A2 | 6/2009 |

OTHER PUBLICATIONS

F. Li, A. Lai, and D. Ddl, "Evidence of Advanced Persistent Threat: A Case Study of Malware for Political Espionage," 6th Int'l Conf. Malicious and Unwanted Software (Malware 11), IEEE, 2011, pp. 102-109. [retreived Jun. 29, 2018].

(Continued)

*Primary Examiner* — Maung T Lwin
(74) *Attorney, Agent, or Firm* — Harrington & Smith (57) ABSTRACT

A computer system trains an Artificial Intelligence (AI) model to generate a key generated as a same key based on multiple different feature vectors, which are based on specified target environment attributes of a target environment domain. The computer system uses the key to encrypt concealed information as an encrypted payload and distributes the encrypted payload and the trained AI model to another computer system. The other computer system extracts environment attributes based on an environment domain accessible by the other computer system and decodes a candidate key by using the trained AI model that uses the extracted environment attributes of the environment domain as input. The trained AI model is trained to generate a key that is generated as a same key from multiple different feature vectors corresponding to specified target environment attributes of a target environment domain. The other (Continued)

computer system determines whether the candidate key is correct.

19 Claims, 4 Drawing Sheets

(51) Int. Cl.
    *G06K 9/62*     (2006.01)
    *H04L 9/08*     (2006.01)
    *G06N 3/08*     (2006.01)

(52) U.S. Cl.
    CPC .............. *G06K 9/6217* (2013.01); *G06N 3/08* (2013.01); *H04L 9/0861* (2013.01)

(56) References Cited

U.S. PATENT DOCUMENTS

| | | | | |
|---|---|---|---|---|
| 8,438,174 | B2* | 5/2013 | Shields | H04N 21/44008 707/755 |
| 8,838,974 | B2* | 9/2014 | Webb | G06F 21/64 713/168 |
| 9,646,262 | B2* | 5/2017 | Phillipps | G06N 20/00 |
| 2004/0068650 | A1* | 4/2004 | Resnitzky | H04L 63/061 713/155 |
| 2010/0076783 | A1* | 3/2010 | Mathur | G06Q 50/22 705/2 |
| 2012/0159193 | A1* | 6/2012 | Spradlin | G06F 21/79 713/190 |
| 2014/0298295 | A1* | 10/2014 | Overbeck | G06F 1/329 717/124 |
| 2015/0089645 | A1* | 3/2015 | Vandergeest | G06F 21/55 726/23 |
| 2015/0207782 | A1* | 7/2015 | Hattori | G06F 21/6227 713/168 |
| 2015/0373036 | A1* | 12/2015 | Patne | G06F 21/755 726/23 |
| 2016/0246800 | A1* | 8/2016 | Soeder | G06F 16/188 |
| 2017/0200020 | A1* | 7/2017 | Nagata | G06F 21/6209 |
| 2018/0011865 | A1* | 1/2018 | Bowman | G06F 16/137 |
| 2018/0018590 | A1 | 1/2018 | Szeto et al. | |
| 2018/0123797 | A1* | 5/2018 | Noh | H04L 9/3247 |
| 2018/0232663 | A1* | 8/2018 | Ross | G06N 3/0454 |
| 2019/0391892 | A1* | 12/2019 | Sabharwal | G06N 3/02 |

OTHER PUBLICATIONS

Sood, A.K. and Enbody, R.J., "Targeted cyberattacks: a superset of advanced persistent threats", IEEE security & privacy, 11(I), pp. 54-61, Jan./Feb. 2013.

Dhilung Hang Kirat, "Scalable Automated Evasive Malware Analysis", Dissertation, University of California, Santa Barbara, Sep. 2015.

* cited by examiner

AI-POWERED CYBER DATA CONCEALMENT AND TARGETED MISSION EXECUTION

BACKGROUND

This invention relates generally to computer security and, more specifically, relates to artificial intelligence (AI)-powered cyber data concealment and targeted mission execution.

This section is intended to provide a background or context to the invention disclosed below. Unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

A secure and concealed operation of targeted cyber mission execution is an emerging and important technology area. Such targeted cyber mission execution may be used, for instance, in the following potential settings:

1. Highly specific and concealed digital rights management (intellectual property protection, software licensing), e.g., where certain code can only be executed under very confined conditions identified by the AI (and that the code would remain concealed otherwise). For instance, software might only be accessible (e.g., as a targeted payload) by a certain person or a certain computer system or environment. The latter might be used in a software-licensing scenario, such that only entities authorized to use the software may be able to do so.

2. Concealed conversations/exchange of data. One example is that a targeted payload might be used to deliver a protected secret to a certain person and only to that person.

Existing methods for targeted cyber mission execution include target information in the payload, which make it possible to discover the target information through payload analysis. That is, analysis of the payload provides access to the information about the target and therefore the target can be determined. Furthermore, other techniques use some external form of server communication, such as to verify rights or retrieve some payload, which weakens the concealment and creates an additional critical dependency for successful payload deployment. The current methods therefore could reveal and prevent implementation of digital rights management and concealed conversations/exchange of data.

SUMMARY

This section is meant to be exemplary and not meant to be limiting.

In an exemplary embodiment, a method is disclosed. The method comprises training by a computer system an artificial intelligence model to generate a key, wherein the key is generated as a same key based on multiple different feature vectors, the feature vectors based on specified target environment attributes of a target environment domain. The method also includes using by the computer system the key to encrypt concealed information as an encrypted payload. The method includes distributing by the computer system the encrypted payload and the trained artificial intelligence model to another computer system.

Another exemplary embodiment is an apparatus. The apparatus comprises memory having computer readable code and one or processors. The one or more processors, in response to retrieval and execution of the computer readable code, cause the apparatus to perform operations comprising: training by a computer system an artificial intelligence model to generate a key, wherein the key is generated as a same key based on multiple different feature vectors, the feature vectors based on specified target environment attributes of a target environment domain; using by the computer system the key to encrypt concealed information as an encrypted payload; and distributing by the computer system the encrypted payload and the trained artificial intelligence model to another computer system.

A further example is a computer program product comprising a computer readable storage medium having program instructions embodied therewith, the program instructions executable by a device to cause the device to perform operations comprising: training by a computer system an artificial intelligence model to generate a key, wherein the key is generated as a same key based on multiple different feature vectors, the feature vectors based on specified target environment attributes of a target environment domain; using by the computer system the key to encrypt concealed information as an encrypted payload; and distributing by the computer system the encrypted payload and the trained artificial intelligence model to another computer system.

An additional example is a method. The method includes receiving at a computer system an encrypted payload and a trained artificial intelligence model and extracting environment attributes based on an environment domain accessible by the computer system. The method further includes decoding, by the computer system, a candidate key by using the trained artificial intelligence model that uses the extracted environment attributes of the domain environment as input, wherein the trained artificial intelligence model is trained to generate a key, wherein the key is generated as a same key from multiple different feature vectors corresponding to specified target environment attributes of a target environment domain. The method includes determining whether the candidate key is a correct key, wherein the candidate key can be correctly decoded only in response to the environment attributes meeting the specified target environment attributes. The method also includes in response to a determination the candidate key is a correct key, performing operations comprising: using by the computer system the decoded candidate key to decrypt the encrypted payload; and executing by the computer system the decrypted payload.

Another exemplary embodiment is an apparatus. The apparatus comprises memory having computer readable code and one or processors. The one or more processors, in response to retrieval and execution of the computer readable code, cause the apparatus to perform operations comprising: receiving at a computer system an encrypted payload and a trained artificial intelligence model; extracting environment attributes based on an environment domain accessible by the computer system; decoding, by the computer system, a candidate key by using the trained artificial intelligence model that uses the extracted environment attributes of the domain environment as input, wherein the trained artificial intelligence model is trained to generate a key, wherein the key is generated as a same key from multiple different feature vectors corresponding to specified target environment attributes of a target environment domain; determining whether the candidate key is a correct key, wherein the candidate key can be correctly decoded only in response to the environment attributes meeting the specified target environment attributes; and in response to a determination the candidate key is a correct key, performing operations comprising: using by the computer system the decoded candidate key to decrypt the encrypted payload; and executing by the computer system the decrypted payload.

A further example is a computer program product comprising a computer readable storage medium having program instructions embodied therewith, the program instructions executable by a device to cause the device to perform operations comprising: receiving at a computer system an encrypted payload and a trained artificial intelligence model; extracting environment attributes based on an environment domain accessible by the computer system; decoding, by the computer system, a candidate key by using the trained artificial intelligence model that uses the extracted environment attributes of the domain environment as input, wherein the trained artificial intelligence model is trained to generate a key, wherein the key is generated as a same key from multiple different feature vectors corresponding to specified target environment attributes of a target environment domain; determining whether the candidate key is a correct key, wherein the candidate key can be correctly decoded only in response to the environment attributes meeting the specified target environment attributes; and in response to a determination the candidate key is a correct key, performing operations comprising: using by the computer system the decoded candidate key to decrypt the encrypted payload; and executing by the computer system the decrypted payload.

DETAILED DESCRIPTION

The following abbreviations that may be found in the specification and/or the drawing figures are defined as follows:

AI artificial intelligence
Cyber relating to or characteristic of the culture of computers, information technology, and/or virtual reality
DNN deep neural network, e.g., a neural network with more than two layers between the input layer and output layer
GPS global positioning system
I/F interface
PCA principal component analysis
N/W network
ON output node The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, existing methods for targeted payload delivery include target information in the payload, which make it possible to discover the target information through payload analysis. That is, analysis of the payload provides access to the information about the target and therefore the target can be determined. Furthermore, other techniques use some external form of server communication, which weakens the concealment and creates an additional critical dependency for successful payload deployment.

In this disclosure, a fundamentally different approach is used where the targeted mission payload includes no information about the target. The payload is, however, still able to be triggered when the payload reaches the target without the need of some external form of server command. Furthermore, the payload is used for beneficial purposes, such as message delivery to only a certain person or for software licensing to only a certain person, computer system, or environment.

In an example, a method is disclosed for information concealment and targeted dissemination of concealed information using artificial intelligence methods such as a DNN model. The concealed information can be confidential documents or secret cyber mission payload (e.g., code), or any other information one person wishes to keep secret and to have revealed only when certain conditions are met. In particular, the trigger condition is hidden in the AI model that is used.

There are three layers of concealment that are used herein.

1) Target Class: Leveraging the fact that a DNN or other AI model cannot be easily interpreted, a black-box DNN model may be used that conceals the target class (e.g., for a DNN as an AI model that takes an image as input, the DNN does not reveal whether the DNN is looking for faces, or certain text, or a completely obscure object recognized by the model in an image).

2) Target Instance: Even if the target type is successfully guessed by the adversary, no information about the true target instance (e.g., a face of an individual) is included in the final payload.

3) Intent: The payload (e.g., document and/or code) is fully encrypted, thereby concealing the mission's true intent.

Related use cases include but are not limited to the following: personalized/system dependent software licenses (software IP protection), concealed data transmission/exchange, and other cases where a secret is revealed only to a certain entity.

Additional overview of possible exemplary embodiments is as follows. In an exemplary embodiment, a cyber-mission payload is encrypted using an encryption key, but the encryption key is not included in the payload itself. The encryption key is instead "built into", using artificial intelligence methods of recognizing the target environment, the model that is applied to target environment attribute(s) used to reveal the (encrypted) payload. The encrypted mission payload is disseminated (e.g., in the sense that it is successfully decrypted and executed) only when the payload recognizes the true target. Since the target environment itself is used to reveal the key to the encrypted payload, it should not be possible to identify the target by analyzing the payload. An exemplary embodiment has two main phases: 1) extraction of the target environment attributes using an AI process; and 2) encoding of the key generation methods in the AI process.

Regarding phase (1), extraction of the target environment attributes, exemplary embodiments can deploy multiple methods for extraction of target environment attributes and build an AI model to recognize multidimensional features of the environment. For example, an implementation may use audio/visual attributes of the environment and build deep neural network (DNN)-based features for recognizing, e.g., the face and voice (e.g., of a user) associated with the target environment. This might be applicable, for instance, for a user that uses an environment on a mobile device. As another example, another implementation may use audio/visual/geolocation/motion attributes of the environment and build DNN-based features for recognizing a desired property (e.g., a face, a voice, a gait, and the like) (or properties) associated with the target environment. This might be applicable, for instance, for an environment on a mobile device.

Regarding phase (2), encoding of the key generation methods in the AI process, the key generation method can use a provided or randomly generated key and train an AI model based on the key and the target environment. The key generation method will "unlock" the key only in response to meeting the requisite target environment attributes.

More detail regarding these techniques is presented after a system into which the exemplary embodiments may be used is described.

Figure 1:
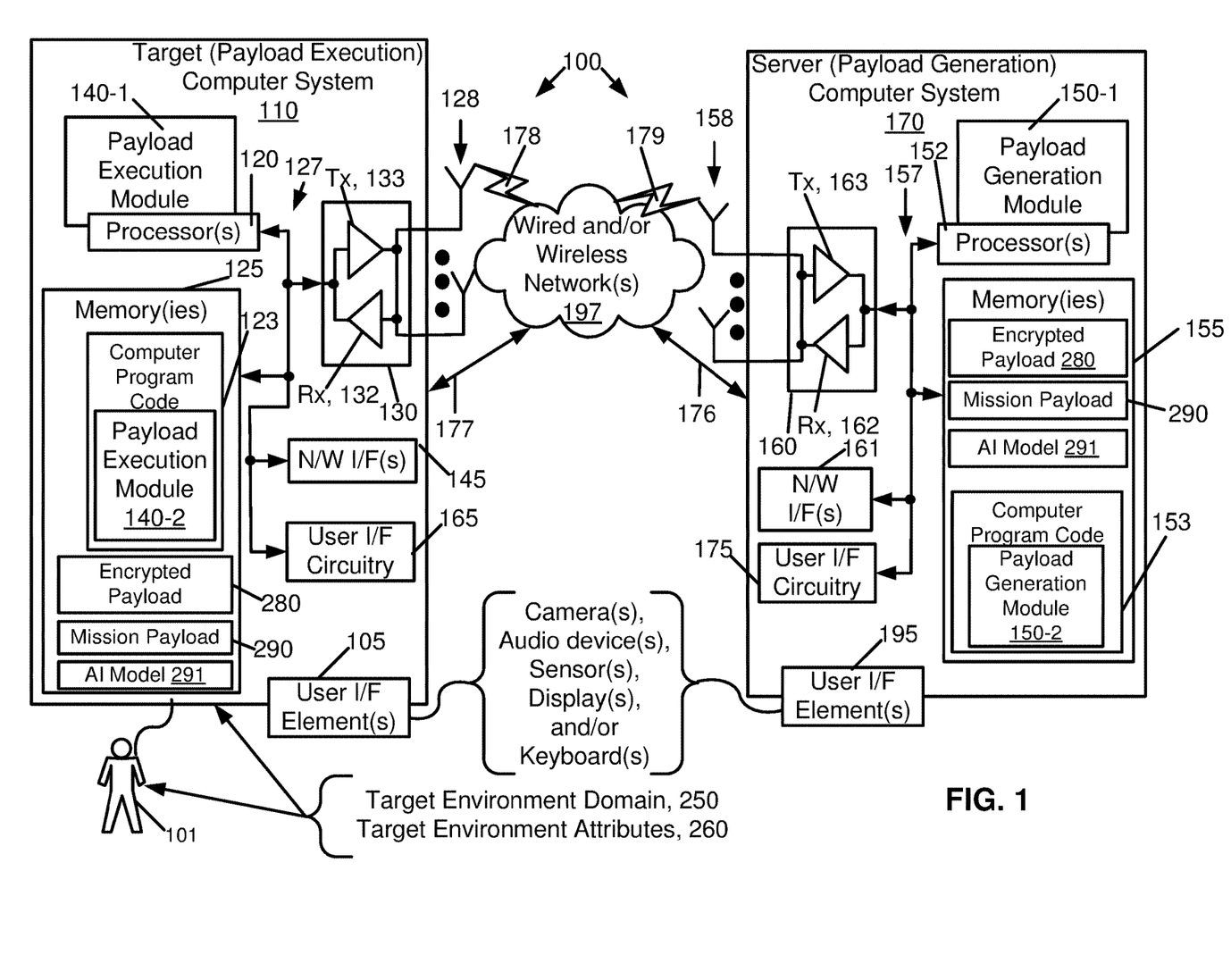
FIG. 1 shows a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a computer system 110 is in wired and/or wireless communication with a computer system 170 in a communications network 100. As a simple overview, the computer system 170 uses a payload generation module 150 to generate an encrypted payload 280, which the computer system 170 distributes to (e.g., at least) the computer system 110 that executes the payload. For ease of reference, the computer system 170 may be thought of as a payload generation computer system, and is described herein as a "server" computer system, in the sense that the server computer system 170 serves (e.g., distributes) at least the encrypted payload 290 to the target computer system 110. The target computer system 110 may be thought of as a payload execution computer system. There does not need to be (but there could be) a client/server relationship between the target computer system 110 and the server computer system 170.

As explained in more detail below, the server computer system 170, e.g., via the payload generation module 150, uses an AI model 291 that uses a target environment domain 250 and also target environment attributes 260 to generate a target key (not shown in FIG. 1, but shown in other figures), and uses the target key to encrypt a mission payload 290 to create the encrypted payload 280. The target environment domain 250 refers to the domain or class of entity to which a payload is targeted, while the target environment attributes 260 refer to those specific (and preselected by a person) attributes of the target environment domain that are leveraged to identify the target. For instance, if a target is an "individual", the target environment domain 250 may be "people". There are multiple target environment attributes 260 that can identify an individual from a group of people, the facial structure and the voice being obvious ones. If the target is an industrial control system, the attributes can be entirely defined from the software environment such as the installed software and logs of target environment (as opposed to the visual and audio environment). If a target is say a terrorist organization, one may have to be creative in defining the target attributes, which could include but are not limited to facial, voice, and language recognition, geolocation, conversation context recognition, and the like.

The server computer system 170 distributes the encrypted payload 280 and the AI model 291 to the target computer system 110, which is used by a (e.g., certain) user 101. The target environment domain 250 and also target environment attributes 260 are associated with one or both of the user 101 and the target computer system 110. The target computer system 110, assuming the system meets certain requirements for the target environment domain 250 (and the corresponding target environment attributes 260), can decrypt the encrypted payload 280 using the AI model 291, and execute the resultant mission payload 290. Specifically, the encrypted payload 280 can only be decrypted in response to environment attributes of the target environment being determined to meet the target environment attributes 260. In particular, the key will only be revealed in response to environment attributes of the target environment being determined to meet the target environment attributes 260. These operations may use the payload execution module 140. If the target computer system 110 does not meet the requirements for the target environment domain 250 (and the corresponding target environment attributes 260), the target computer system 110 cannot decrypt the encrypted payload 280 and therefore does not execute the mission payload 290.

The mission payload 290 may be executed and result in, e.g., one or more of the following, meant for only a specific person, computer, or computing environment: a hidden message; "unlocked" software, which would allow for software licensing for those entities; revelation of intellectual property; or any other secret meant to be revealed only to specific entities.

The target computer system 110 may be a mobile device that can access the communications network 100, although the target computer system 110 may also be any other type of computer system including a personal computer, laptop, Internet of Things devices, and the like. The target computer system 110 includes one or more processors 120, one or more memories 125, one or more transceivers 130, one or more network (N/W) interfaces (I/F(s)) 145, and user interface circuitry 165, interconnected through one or more buses 127. Each of the one or more transceivers 130 includes a receiver, Rx, 132 and a transmitter, Tx, 133. The one or more buses 127 may be address, data, and/or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123, the encrypted payload 280, and the mission payload 290. The UE 110 includes a payload execution module 140, comprising one of or both parts 140-1 and/or 140-2, which may be implemented in a number of ways. The payload execution module 140 may be implemented in hardware as payload execution module 140-1, such as being implemented as part of the one or more processors 120. The payload execution module 140-1 may be implemented also as an integrated circuit or through other hardware such as a programmable gate array. In another example, the payload execution module 140 may be implemented as payload execution module 140-2, which is implemented as computer program code 123 and is executed by the one or more processors 120. For instance, the one or more memories 125 and the computer program code 123 may be configured to, with the one or more processors 120, cause the target computer system 110 to perform one or more of the operations as described herein. It should also be noted that the devices shown in the target computer system 110 are not limiting and other, different, or fewer devices may be used.

The user interface circuitry 165 communicates with one or more user interface elements 105, which may be formed integral with the target computer system 110 or be outside the target computer system 110 but coupled to the target computer system 110. The user interface elements 105 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used.

The target computer system 110 communicates with server computer system 170 via one or more wired or wireless networks 197. The server computer system 170 includes one or more processors 152, one or more memories 155, one or more network interfaces (N/W I/F(s)) 161, one or more transceivers 160, and user interface circuitry 175, interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153, the encrypted payload 280, and the mission payload 290. The server computer system 170 includes a payload generation module 150, comprising one of or both parts 150-1 and/or 150-2, which may be implemented in a number of ways. The payload generation module 150 may be implemented in hardware as payload generation module 150-1, such as being implemented as part of the one or more processors 152. The payload generation module 150-1 may be implemented also as an integrated circuit or through other hardware such as a programmable gate array. In another example, the payload generation module 150 may be implemented as payload generation module 150-2, which is implemented as computer program code 153 and is executed by the one or more processors 152. For instance, the one or more memories 155 and the computer program code 153 are configured to, with the one or more processors 152, cause the server computer system 170 to perform one or more of the operations as described herein. It should also be noted that the devices shown in the server computer system 170 are not limiting and other, different, or fewer devices may be used.

The one or more buses 157 may be address, data, and/or control buses, and may include any interconnection mechanism, such as a series of lines on a motherboard or integrated circuit, fiber optics or other optical communication equipment, wireless channels, and the like. The user interface circuitry 175 communicates with one or more user interface elements 195, which may be formed integral with the server computer system 170 or be outside the server computer system 170 but coupled to the server computer system 170. The user interface elements 195 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used.

Figure 2:
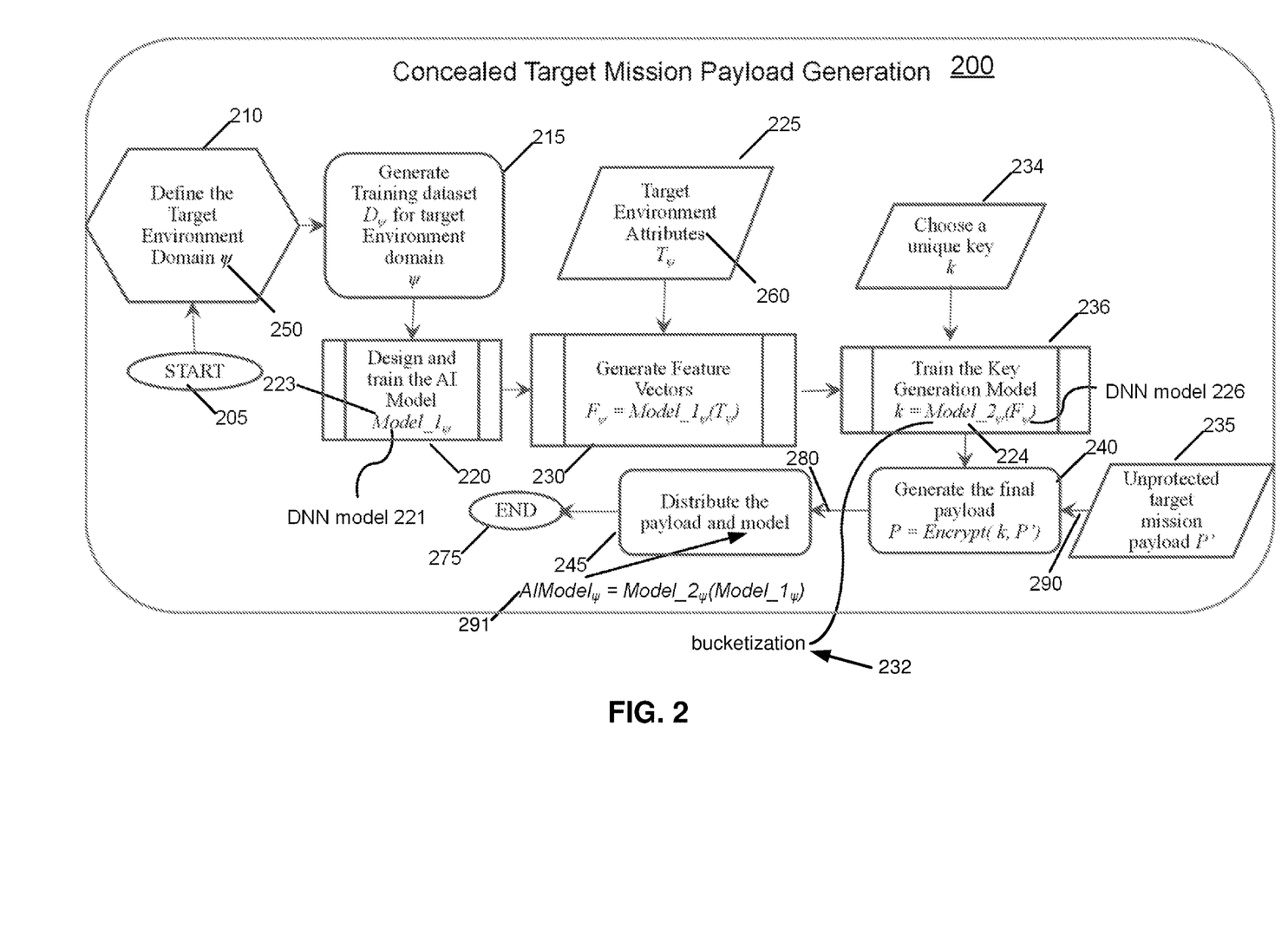
FIG. 2 is a block diagram illustrating an exemplary process for concealed target mission payload generation.

Now that one possible exemplary system has been described, the exemplary embodiments are described in more detail. Turning now to FIG. 2, a block diagram is shown illustrating an exemplary process 200 for concealed target mission payload generation. The process 200 illustrates the operation of an exemplary method or methods, a result of execution of computer program instructions embodied on a computer readable memory, functions performed by logic implemented in hardware, and/or interconnected means for performing functions in accordance with exemplary embodiments. The process 200 is performed by the server computer system 170, e.g., under control of the payload generation module 150.

In an exemplary embodiment "generic training" and "specific training" are combined, which provides for robust key generation. The general training the example of FIG. 2 includes blocks 210, 215 and 220, while the specific training includes blocks 225 through 236. Both the generic training and specific training may use AI models such as DNN models. The input for the specific training is the output of the DNN model from the generic training. That is, they are not two independent approaches, but instead are combined. The output is the AI model 291, but this model is made, in an exemplary embodiment, from two other AI models 223, 224. This is described in more detail below.

Block 205 indicates a starting point for the process 200. In block 210, the target environment domain $\psi$ 250 is defined. Typically, a person or an implementer should define the target. The target environment domain 250 may be a human face recognized from an image frame for video (e.g., using a camera). Other target environment domains $\psi$ 250 are possible, such as a voice in an audio recording, a gait defined using multiple sensors, and the like.

The server computer system 170 in block 215 generates the training dataset $D_\psi$ for the target environment domain $\psi$ 250. Such a dataset for a human face (for instance) may include multiple (e.g., many) pictures having the human face in it. In block 220, the server computer system 170 trains an AI model 223 Model_1$_\psi$. This is part of the generic training. Such an AI model 223 may be a DNN model 221 for face recognition, for example. Typically, a human being designs the DNN "template" (e.g., depth of the network, convolution and pooling layers, and the like) for the DNN model 221, while the computer can implement the final model needed for a specific key size. Potentially, any neural network-based models can be used. However, AI models for binary classification might not be able to be used, as output for these models is just yes/no, which may not be sufficient for generating a key. The DNN model 221 (e.g., Model_1$_\psi$), from the generic training, is trained to recognize the target. This training uses the training dataset $D_\psi$ that has been generated in block 215 for the environment domain v.

The generic training dataset includes enough samples that can "effectively generalize" the target domain/class for recognition, e.g., in this example, a large set of pictures of human faces (which may or may not include the pictures of the target, or alternatively entirely made out of a large set of pictures of the target). Here, the pictures of the target are equivalent to the block 260, which is important for the next phase of generating the feature vectors (see block 230). That is, if we use a pre-trained face recognition model as our Model_1$_\psi$, this pre-trained face recognition model may not have been trained for the specific target face, but we can still use the model to generate effective facial feature vectors $F_\psi$ in block 230.

The DNN model 221 (e.g., Model_1$_\psi$), from the generic training, also outputs feature vectors (e.g., 256-valued facial feature vectors). In more detail, in block 230, the server computer system 170 generates the feature vectors $F_\psi$=Model_1$_\psi$ ($T_\psi$). The Model_1$_\psi$ outputs a collection of (e.g., facial) feature vectors that are not exactly the same feature vectors but, e.g., are closely located in the high-dimensional feature space.

This block uses the target environment attributes $T_\psi$ 260 (see block 225), which sets the feature vectors based on the target environment attributes $T_\psi$ 260 that will later be used to "unlock" the key. Such attributes 260, using the human face example, may include an image of the target individual's face. Whether one needs an "exact" copy of the target environment attributes $T_\psi$ 260 in order for decoding to occur depends on the ability of Model_$1_\psi$ in recognizing the target at its different forms. For instance, typical models 223 such as a Model_$1_\psi$ being used today for face recognition can recognize an individual even if the input is not an "exact" copy of one of the training set. It is expected that models 223 for other systems, such as software, will also have similar abilities.

In block 236, the server computer system 170 trains the key generation model Model_$2_\psi$ ($F_\psi$). This is part of the specific training. This block uses (from step 234) a unique key k that has been chosen (e.g., randomly or by a person). As previously described, the DNN model 221 (e.g., as Model_$1_\psi$) from the generic training is trained to recognize the target and output feature vectors $F_\psi$ (e.g., 256-valued facial feature vectors). These feature vectors of the target become the input training set for the specific training, which trains another DNN model 226 (e.g., as another AI model 224, Model_$2_\psi$) to generate a predefined (e.g., randomly generated) unique key k. The Model_$2_\psi$ 224 can be considered as a multi-label classifier, where the key k is derived from the output labels and the number of labels determines the size of the key.

That is, assuming the target environment domain $D_\psi$ concerns images, then with a collection of face images of the same target person as a training set in block 215, Model_$1_\psi$ outputs a collection of facial feature vectors $F_\psi$ (e.g., not exactly the same feature vectors but closely located in the high-dimensional feature space), while Model_$2_\psi$ takes these facial feature vectors $F_\psi$ and outputs the exact same set of labels (i.e., the predefined unique key). Finally, both Model_$1_\psi$ and Model_$2_\psi$ may be chained together to represent AIModel_$\psi$ (i.e., AIModel_$\psi$ =Model_$2_\psi$ (Model_$1_\psi$). The Model_$1_\psi$ can be a pre-trained model (e.g., generic face recognition model). However, Model_$2_\psi$ is trained for the specific target and specific key.

One exemplary implementation that might be used involves a level of bucketization 232 for DNN noise tolerance. For example, if the output layer (shown in more detail in FIG. 2A) of the DNN model 226 has 256 nodes and if each node's value is bucketized into two buckets, the output of the DNN model 226 becomes equivalent to a 256-bit output. This is explained in more detail in reference to FIG. 2A, described below.

In block 240, the server computer system 170 generates the final encrypted payload 280 as per the following: P=Encrypt(k, P'), which encrypts the unprotected payload P' with key k. The unprotected target mission payload P' 290 is supplied to block 240 by block 235. The unprotected target mission payload P' 290 can be a beneficial payload and result in, for instance, display of a (e.g., top) secret document, or display of other material a person would like to remain confidential and exposed only to a certain user 101, or revelation (e.g., and installation) of software (e.g., and corresponding installation instructions), or some combination of these. That is, the result of the execution of the payload can, for instance, display the secret document.

In block 245, the server computer system 170 distributes the encrypted payload 280 and the AIModel_$\psi$ (•) with existing methods (not covered in this disclosure). This distribution could be to a single target computer system 110 or to multiple target computer systems 110. The process 200 ends in block 275.

Figure 2A:
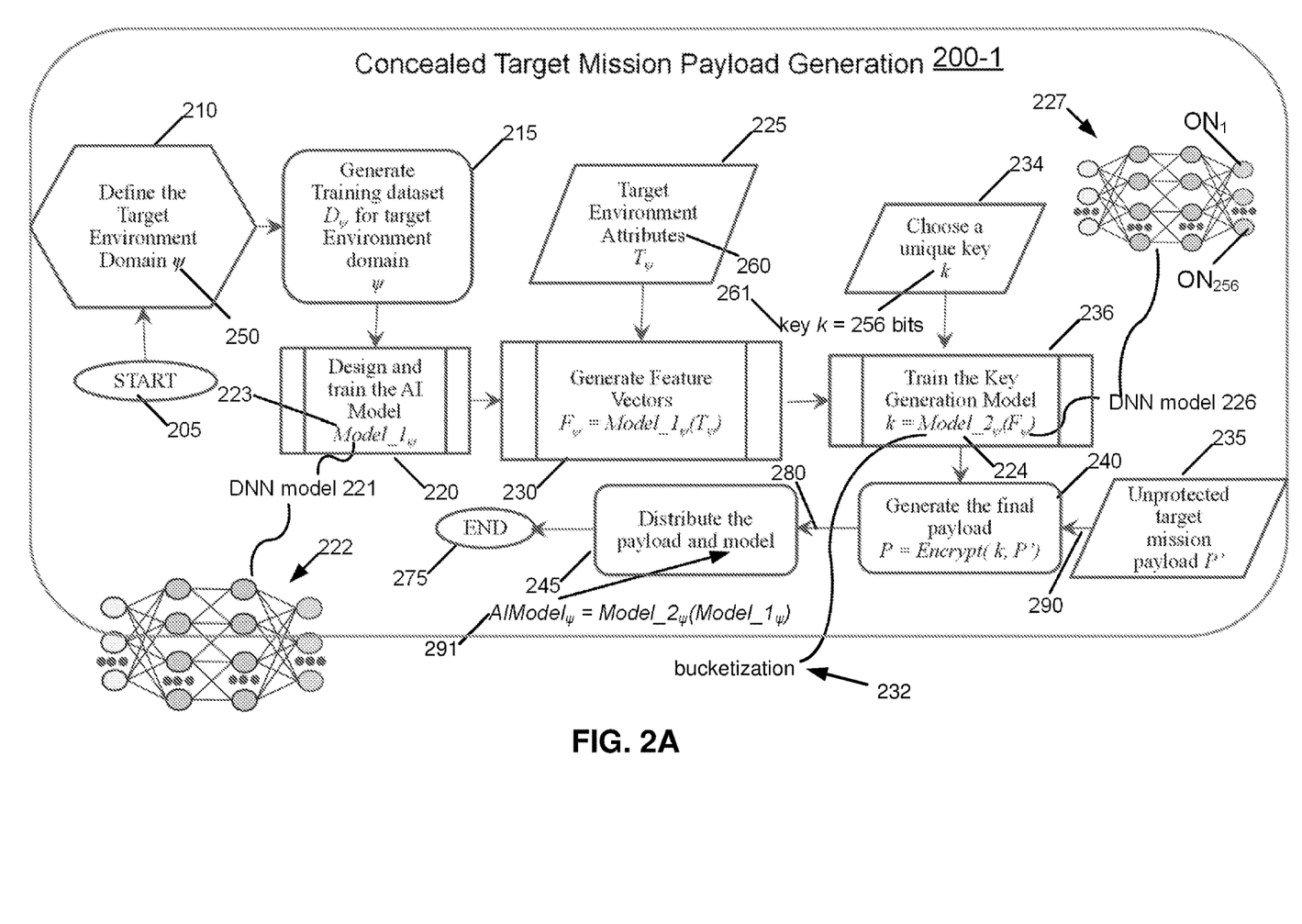
FIG. 2A illustrates a specific example using the process in FIG. 2.

Turning to FIG. 2A, this illustrates a specific example using the process in FIG. 2. FIG. 2A is used to help explain the key generation with an example for a concealed target mission payload generation 200-1. In this example, the DNN model 221 is shown as a DNN 222, and the DNN model 226 is shown as another DNN 227. The DNN 227 has 256 output nodes (ONs) $ON_1$ through $ON_{256}$. It is noted that the hidden layers of the DNNs 222 and 227 are illustrated where each neuron from one hidden layer only connects to some of the neurons from another hidden layer. This is for illustration purposes, and each neuron for one hidden layer may connect to some or all of the neurons from another hidden layer, depending on implementation. Consider the following exemplary details.

1) Choose a random key k of size 256-bit (block 234). This size can be larger or smaller than the size of the feature vectors $F_\psi$ from block 230 (e.g., a larger size will make it harder to perform a brute force attack).

2) Design the DNN Model_$2_\psi$, where the final output of the DNN 227 has 256 nodes corresponding to 256 bits: i.e., output nodes can be labeled as bit-1 ($ON_1$), bit-2 ($ON_2$), bit-3 ($ON_3$), . . . , bit-256 ($ON_{256}$).

3) For the training dataset for Model_$2_\psi$ training, we have the following:

(a) Input to the model: a set of feature vectors $F_\psi$ generated (block 230) from the multiple set of target environment attributes (block 260). For instance, this may be 10 sets of facial feature vectors from 10 different pictures of the same target individual's face.

(b) Output of the model: the key (k) of size 256-bits chosen in step (1) is mapped to corresponding output nodes: i.e., bit-1 ($ON_1$), bit-2 ($ON_2$), bit-3 ($ON_3$), . . . , bit-256 ($ON_{256}$), for the output nodes can have a ground truth value of 0 (zero) or 1 (one), depending on the corresponding bit of the random key k.

4) Train the Model_$2_\psi$ such that this model can output the specific random key k chosen in step (1) as its output layer weights when the feature vectors $F_\psi$ from the target are supplied as input. A bucketization 232 of output node weights (e.g., which may be floating point values) may be used to derive the bits of the key (e.g., with a binary true/false label). That is, all 10 photographs generate "similar" facial feature vectors from Model_$1_\psi$ but when these feature vectors are fed into Model_$2_\psi$, they all generate the exact same key k (e.g., after bucketization for instance).

The Model_$1_\psi$ 223 (as DNN 222 in this example) is pre-trained to work on the "class" of the target (in this example, an arbitrary face image classified using a corresponding facial feature vector), while Model_$2_\psi$ 224 (e.g., as DNN 227) is specifically trained to recognize the specific "instance" of the target class (in this example, a face of a specific individual).

If a large dataset of the target environment is available (e.g., hundreds of pictures of the same target individual's face as an example with different lighting conditions and from different angles), in theory a single monolithic large DNN (or other AI model) that combines Model_$1_\psi$ and Model_$2_\psi$ can be built and trained to directly output the key. However, the Model_$1_\psi$/Model_$2_\psi$ split as illustrated, e.g., in FIGS. 2 and 2A is more practical, as this split allows using easily-available target-domain-specific pre-trained models such as for voice recognition and object recognition.

Figure 3:
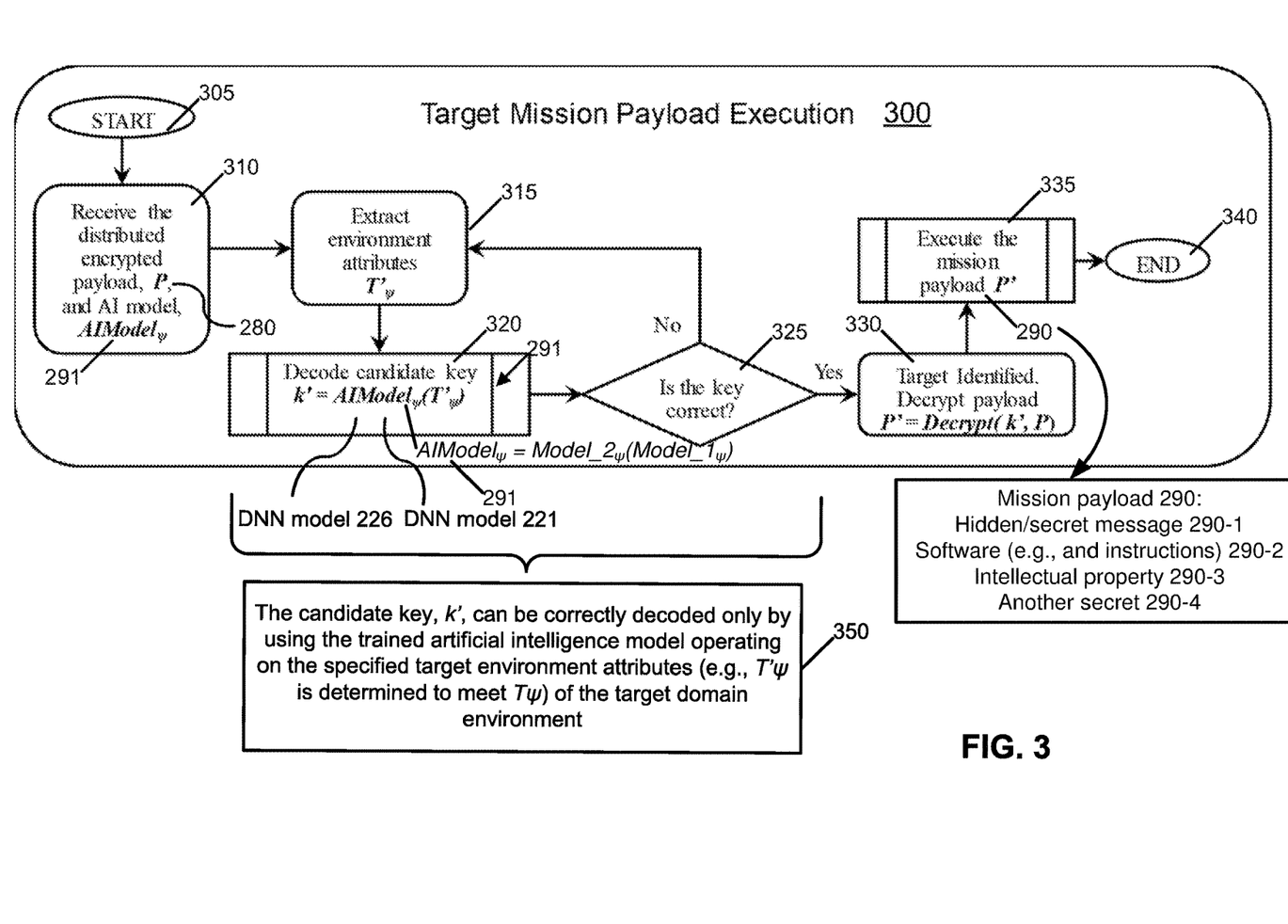
FIG. 3 is a block diagram illustrating an exemplary process for target mission payload execution.

Refer now to FIG. 3, which is a block diagram illustrating an exemplary process 300 for target mission payload execution. The process 300 illustrates the operation of an exemplary method or methods, a result of execution of computer program instructions embodied on a computer readable memory, functions performed by logic implemented in hardware, and/or interconnected means for performing functions in accordance with exemplary embodiments. The process 300 is performed by the target computer system 110, e.g., under control of the payload execution module 140.

The process 300 starts in block 305, and the target computer system 110 in block 310 receives the distributed encrypted payload, P, 280 and the AI model 291, $AIModel_\psi$. In block 315, the target computer system 110 starts target mission execution with environment probing by extracting environment attributes $T'_\psi$. Such attributes, using the human face example, may include an image of the target individual's face. Such image may be taken by a camera as a user interface element 105 in FIG. 1.

In block 320, the target computer system 110 decodes the candidate key k' using the following: $k'=AIModel_\psi (T'_\psi)$, where $AIModel_\psi=Model\_2_\psi (Model\_1_\psi)$. The $Model\_1_\psi$ generates a feature vector $F'_\psi=Model\_1_\psi (T'_\psi)$, e.g., when applied to the environment attributes $T'_\psi$. The key generation model $Model\_2_\psi (F'_\psi)$ produces the candidate key k', which may or may not be a correct key. The target computer system 110 in block 325 determines whether the candidate key k' is a correct key. There are many approaches that might be used, such as checking for a predefined signature as the preamble of the decrypted data. If the key is not correct (block 325=No), the flow proceeds back to block 315 where the target computer system 110 extracts environment attributes $T_\psi$, e.g., using a camera for facial recognition. If the key is correct (block 325=Yes), this correct key generation indicates successful target identification. As indicated in block 350, the candidate key, k', can be correctly decoded only by using the trained artificial intelligence model 291, $AIModel_\psi$, operating on the specified target environment attributes (e.g., $T'_\psi$ is determined to meet $T_\psi$) of the target domain environment. As described above, the $T'_\psi$ may not have to be "exactly" equivalent $T_\psi$, as today's AI models for face recognition (as one example, but other examples may be similar) can recognize an individual even if the input is not an "exact" copy of one of the training set.

In block 320, if the target computer system 110 correctly decodes the candidate key k' (block 325=Yes), the flow proceeds to block 330. In block 330, the target computer system 110 decrypts the encrypted payload P 280 into the mission payload P' 290 as the following: P'=Decrypt (k', P). The target computer system 110 in block 335 then executes the extracted mission payload P' 290. The mission payload may include the following: a hidden/secret message 290-1; software (e.g., and instructions for installing the same) 290-2; intellectual property 290-3; and/or another secret 290-4. The process 300 ends in block 340.

Additional examples are as follows.

In an exemplary implementation, a novel class of applications using neural networks is powered by artificial intelligence (AI), which is trained to reason about its environment and is able to deliver its secret only when it recognizes its target. As described above, it is possible for an implementation to learn to recognize a specific target, concealing its payload in an application until the intended target is identified. This implementation may leverage various attributes for target identification, including visual, audio, geo-location, and system features. In contrast to existing targeted payload delivery, this type of implementation makes it extremely challenging, if not impossible, to reverse engineer the application and recover the mission-critical secrets, including the payload and the specifics of the target. This makes secret delivery, such as a payload containing software for licensing purposes or containing a message or IP meant only for a specific entity, to be difficult to reverse-engineer.

At its core, AI models (e.g., deep neural networks) are trained to recognize a target, and to dynamically derive a key from the output layers of the network to unlock the payload. Neural networks encode intricate, nonlinear relationships between inputs and outputs, making it exceedingly difficult to identify specific features of the target required to derive the key.

A novel class of targeted payload delivery may include a target-specific mission execution (on desktop and/or mobile environments). An implementation may be performed as follows:

(1) A user downloads an application and possibly validates it against anti-virus software and malware sandboxes.

(2) The user starts the application and the application operates normally as expected.

(3) A designated person may step up in front of the computer, and a few seconds later a screen with the mission payload (such as a secret message, intellectual property information, or instructions on how to install included and unencrypted software, and the like) is shown.

(4) Very well-known applications may be used.

Possible approaches have been described above. As additional detail to the above, AI can transform a concrete logic construct in the form of "if-this-then-that" into a more concealed logic construct made out of, e.g., a large convolutional neural network. Furthermore, the trigger condition is hidden in the AI model. The idea that the encryption key for the concealed cyber mission is not included in the payload, but is instead revealed based on the target environmental attributes using artificial intelligence methods that are capable of recognizing the target environment, is a unique feature. Since the target environment itself is effectively the "key" to the encrypted payload, it is not possible to identify the target by analyzing the payload. The three layers of concealment (described above) make it very difficult for the techniques used herein to be discovered.

The approaches described above may be generalized as follows:

(1) A method is disclosed for information concealment and targeted dissemination of concealed information using artificial intelligence methods, such as a DNN model.

(2) The concealed information can be confidential documents or secret cyber mission payload (code), as examples.

The methodology includes understanding the target environmental attributes:

(1) The approach may deploy multiple methods to extract different types of the target environmental attributes, and build an AI-model to recognize multi-dimensional features of the environment.

(2) For example, an implementation may use audio/visual attributes of the environment and build DNN-based features to recognize the voice/face of the target.

A technical analysis includes the following. It is quite difficult to infer/brute force the correct key for reasonably large key size. Key collision, which accidentally unlocks the payload at non-target environments, is rare. Key derivation accuracy, which reliably derives the correct key at the target environment, is expected to be high, with reasonably large key size. For instance, a key size of 8-bit (a char) will be too easy to brute force or find a key collision, but larger sizes such as 16-bits or higher will be more suitable to prevent a brute for attack or to find a key collision.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   retrieving a specific key;
   training by a computer system an artificial intelligence model to generate outputs, wherein the training is performed so that a value, equal to a value of the specific key, is generated as one of the outputs when any one of multiple different sets of feature vectors is used as an input to the artificial intelligence model, the sets of feature vectors corresponding to a certain software environment and based on specified target environment attributes of a target environment domain, wherein the target environment domain refers to a domain or class of entity to which an encrypted payload is targeted, and wherein the specified target environment attributes comprise attributes of software environments;

using by the computer system the specific key to encrypt information as the encrypted payload; and distributing by the computer system the encrypted payload and the trained artificial intelligence model to a second computer system, for use by the second computer system to use to decrypt, using the trained artificial intelligence model, the encrypted payload in response to recognizing a target comprising the certain software environment.

2. The method of claim 1, wherein:

the artificial intelligence model comprises a first artificial intelligence model for which the training is performed so the value of the specific key is generated as the one of the outputs for each of the multiple different sets of feature vectors;

the artificial intelligence model comprises a second artificial intelligence model that is used to generate the different sets of feature vectors; and the method further comprises generating the different sets of feature vectors using the second artificial intelligence model at least by operating on the specified target environment attributes of the target environment domain, and wherein the specified target environment attributes refer to those specific attributes of the target environment domain that are leveraged to identify the target.

3. The method of claim 2, further comprising training the second artificial intelligence model using a dataset for the target environment domain.

4. The method of claim 2, wherein the first artificial intelligence model comprises a deep neural network and the second artificial intelligence model comprises a deep neural network.

5. The method of claim 2, wherein:

the first artificial intelligence model comprises a plurality of output nodes, each output node outputting a weight; and the training the first artificial intelligence model so the specific key is generated as the one of the outputs for each of the multiple different sets of feature vectors comprises, for each output node, quantizing the corresponding weight into one of a plurality of buckets, each bucket representing a value of bit of a corresponding output.

6. The method of claim 1, wherein the specific key is either provided or randomly generated.

7. The method of claim 1, wherein only the trained artificial intelligence model and the target are necessary to decrypt the encrypted payload.

8. A method, comprising:

receiving at a computer system an encrypted payload and a trained artificial intelligence model;

using the trained artificial intelligence model to decrypt the encrypted payload in response to recognizing a target comprising a certain software environment at least by:

extracting environment attributes based on an environment domain accessible by the computer system, wherein the environment attributes comprise attributes of a software environment;

producing, by the computer system, a candidate key by using the trained artificial intelligence model that uses the extracted environment attributes of the environment domain as input;

determining whether the candidate key is a correct key, wherein the candidate key is correctly produced as the correct key only in response to the environment attributes meeting specified target environment attributes for the target, and wherein the specified target environment attributes comprise attributes of the certain software environment;

in response to a determination the candidate key is the correct key, performing operations comprising:

using by the computer system the decoded candidate key to decrypt the encrypted payload; and executing by the computer system the decrypted payload.

9. The method of claim 8, wherein:

the artificial intelligence model comprises a first artificial intelligence model that is trained to generate a value of the specific key as an output for each of multiple different sets of feature vectors corresponding to the specified target environment attributes of the target environment domain, wherein the specified target environment attributes refer to those specific attributes of the target environment domain that are leveraged to identify the target;

the artificial intelligence model comprises a second artificial intelligence model that generates the sets of feature vectors; and the decoding the candidate key further comprises generating a feature vector using the second artificial intelligence model at least by operating on the extracted environment attributes and generating the candidate key using the first artificial intelligence model at least by operating on the generated feature vector.

10. The method of claim 9, wherein the first artificial intelligence model comprises a deep neural network and the second artificial intelligence model comprises a deep neural network.

11. The method of claim 9, wherein:

the first artificial intelligence model comprises a plurality of output nodes, each output node outputting a value; and the decoding the candidate key comprises the first artificial intelligence model, for each output node, quantizing the corresponding value into one of a plurality of buckets, each bucket representing a value of a bit of a corresponding output.

12. The method of claim 8, wherein:

wherein a trigger condition, at least for the using the decoded candidate key to decrypt the encrypted payload and for the executing by the computer system the decrypted payload, is the determination the candidate key is the correct key, and triggering the using the decoded candidate key to decrypt the encrypted payload and the executing by the computer system the decrypted payload by the triggering condition occurs without an external command; and execution of the payload results in disclosure of material to the target, wherein the material was to remain confidential and exposed only to the target.

13. The method of claim 8, wherein:
execution of the payload results in disclosure of software to the target wherein the software was to remain confidential and exposed only to the target.

14. The method of claim 8, further comprising in response to a determination the candidate key is not a correct key, performing operations comprising:
extracting additional environment attributes based on the environment domain accessible by the computer system; and
decoding another candidate key by using the trained artificial intelligence model using the additional environment attributes of the environment domain as input.

15. The method of claim 8, wherein:
the trained artificial intelligence model is trained to generate a specific key as an output, wherein a value of the specific key is generated when any one of multiple different sets of feature vectors is used as an input to the trained artificial intelligence model, the multiple different sets of feature vectors corresponding to the specified target environment attributes of a target environment domain, wherein the target environment domain refers to a domain or class of entity to which the encrypted payload is targeted.

16. An apparatus, comprising:
memory having computer readable code; and
one or processors, wherein the one or more processors, in response to retrieval and execution of the computer readable code, cause the apparatus to perform operations comprising:
retrieving a specific key;
training by a computer system an artificial intelligence model to generate outputs, wherein the training is performed so that a value, equal to a value of the specific key, is generated as one of the outputs when any one of multiple different sets of feature vectors is used as an input to the artificial intelligence model the sets of feature vectors corresponding to a certain software environment and based on specified target environment attributes of a target environment domain, wherein the target environment domain refers to a domain or class of entity to which an encrypted payload is targeted, and wherein the specified target environment attributes refer to those specific attributes of the target environment domain that are leveraged to identify a target, and wherein the specified target environment attributes comprise attributes of software environments;
using by the computer system the specific key to encrypt information as the encrypted payload; and
distributing by the computer system the encrypted payload and the trained artificial intelligence model to a second computer system, for use by the second computer system to use to decrypt, using the trained artificial intelligence model, the encrypted payload in response to recognizing the target comprising the certain software environment.

17. The apparatus of claim 16, wherein:
the artificial intelligence model comprises a first artificial intelligence model for which the training is performed to so the value of the specific key is generated as the one of the outputs for each of the multiple different sets of feature vectors;
the artificial intelligence model comprises a second artificial intelligence model that is used to generate the different sets of feature vectors; and
the one or more processors, in response to retrieval and execution of the computer readable code, cause the apparatus to perform operations comprising: generating the different sets of feature vectors using the second artificial intelligence model at least by operating on the specified target environment attributes of the target environment domain, and wherein the specified target environment attributes refer to those specific attributes of the target environment domain that are leveraged to identify the target.

18. The apparatus of claim 17, wherein the one or more processors, in response to retrieval and execution of the computer readable code, cause the apparatus to perform operations comprising: training the second artificial intelligence model using a dataset for the target environment domain.

19. The apparatus of claim 17, wherein:
the first artificial intelligence model comprises a plurality of output nodes, each output node outputting a weight; and
the training the first artificial intelligence model so the specific key is generated as the one of the outputs for each of the multiple different sets of feature vectors comprises, for each output node, quantizing the corresponding weight into one of a plurality of buckets, each bucket representing a value of bit of a corresponding output.

* * * * *